J. N. WOOD.
BALING PRESS.
APPLICATION FILED APR. 1, 1909; RENEWED MAR. 22, 1910.

971,949.

Patented Oct. 4, 1910.
4 SHEETS—SHEET 1.

WITNESSES:
Wm. F. Koyle.
R. E. Barry.

INVENTOR
James Nelson Wood
BY
Whitaker & Prevost
Attorneys

J. N. WOOD.
BALING PRESS.
APPLICATION FILED APR. 1, 1909. RENEWED MAR. 22, 1910.

971,949.

Patented Oct. 4, 1910.

4 SHEETS—SHEET 2.

WITNESSES:

INVENTOR

James Nilson Wood

BY

Attorney

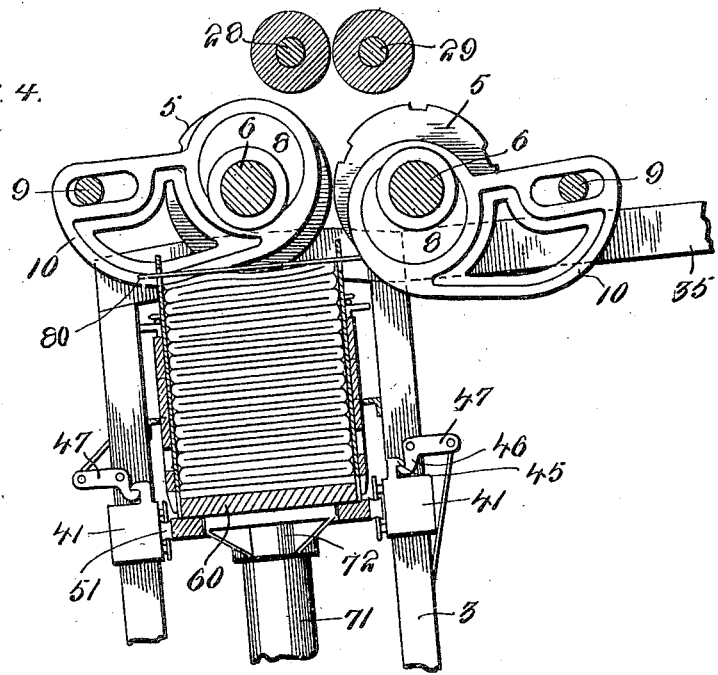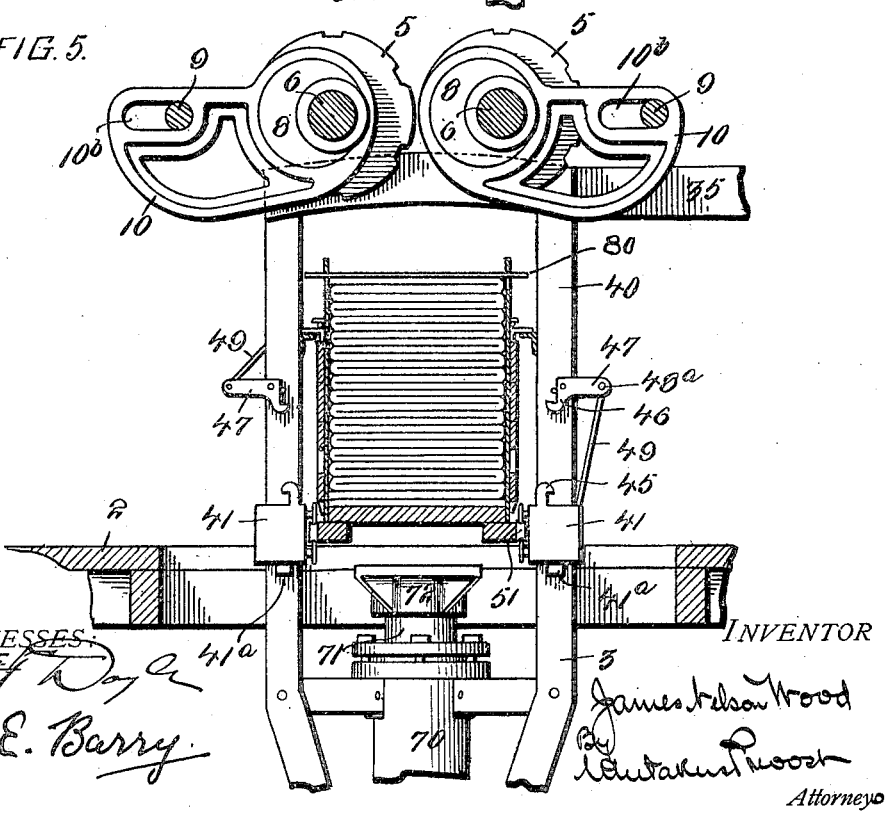

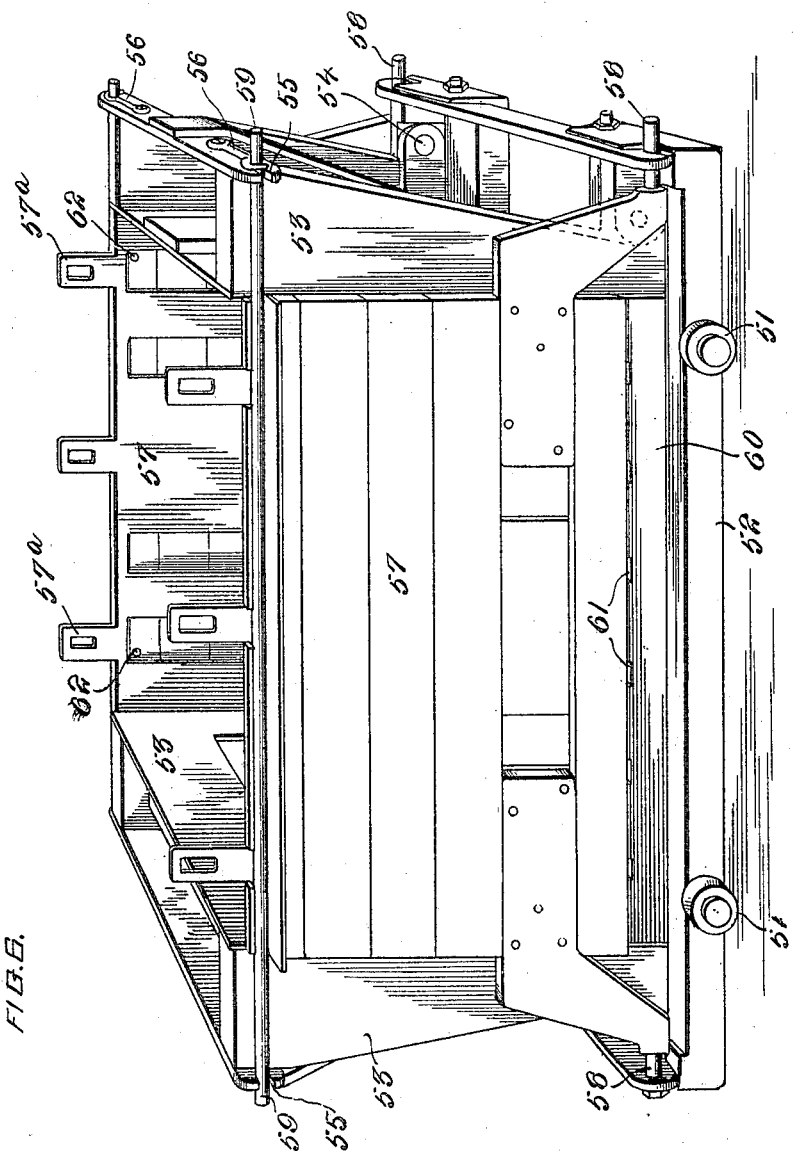

UNITED STATES PATENT OFFICE.

JAMES N. WOOD, OF RICHMOND, VIRGINIA, ASSIGNOR TO THE NEELY COMPRESS AND COTTON CO., INC., OF RICHMOND, VIRGINIA.

BALING-PRESS.

971,949.      Specification of Letters Patent.      Patented Oct. 4, 1910.

Application filed April 1, 1909, Serial No. 487,229. Renewed March 22, 1910. Serial No. 551,003.

*To all whom it may concern:*

Be it known that I, JAMES N. WOOD, citizen of the United States, residing at Richmond, in the county of Henrico and State of Virginia, have invented certain new and useful Improvements in Baling-Presses; and I do hereby declare the following to be a full, clear, and exact description of the invention, such as will enable others skilled in the art to which it appertains to make and use the same.

My present invention is an improvement on the cotton baling press covered by my former application filed Feb. 23, 1909 and given Serial Number 479,380 and consists in certain novel features hereinafter described reference being had to the accompanying drawings which illustrate one form in which I have contemplated embodying my invention and said invention is fully disclosed in the following description and claims.

My present improvements consist principally in the means for confining the completed bale in the bale box and for securing the ready removal of the bale therefrom and for facilitating the application of the bale bands and the cover or burlap when used, and in details of construction contributing to these ends.

Figure 1:
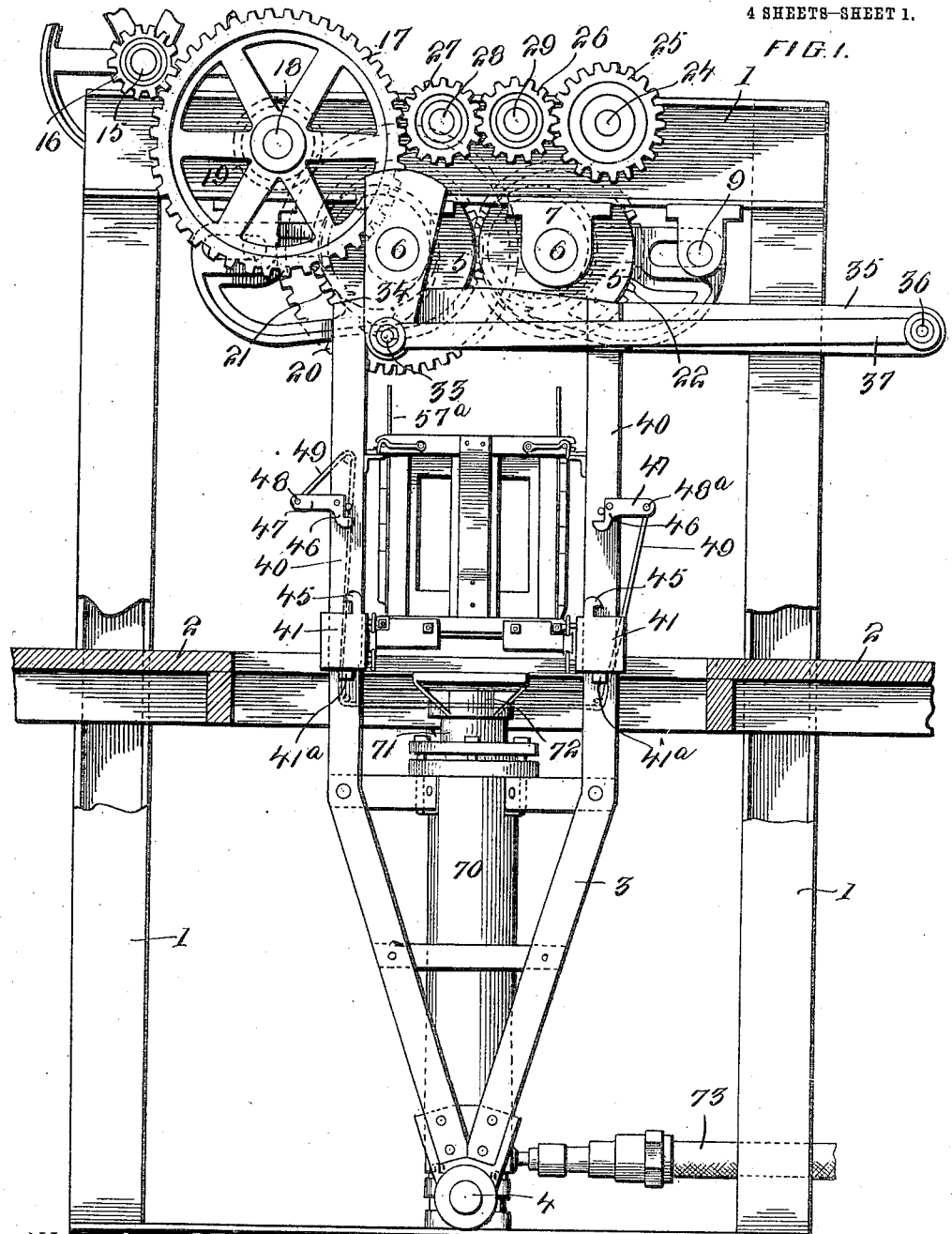
Figure 2:
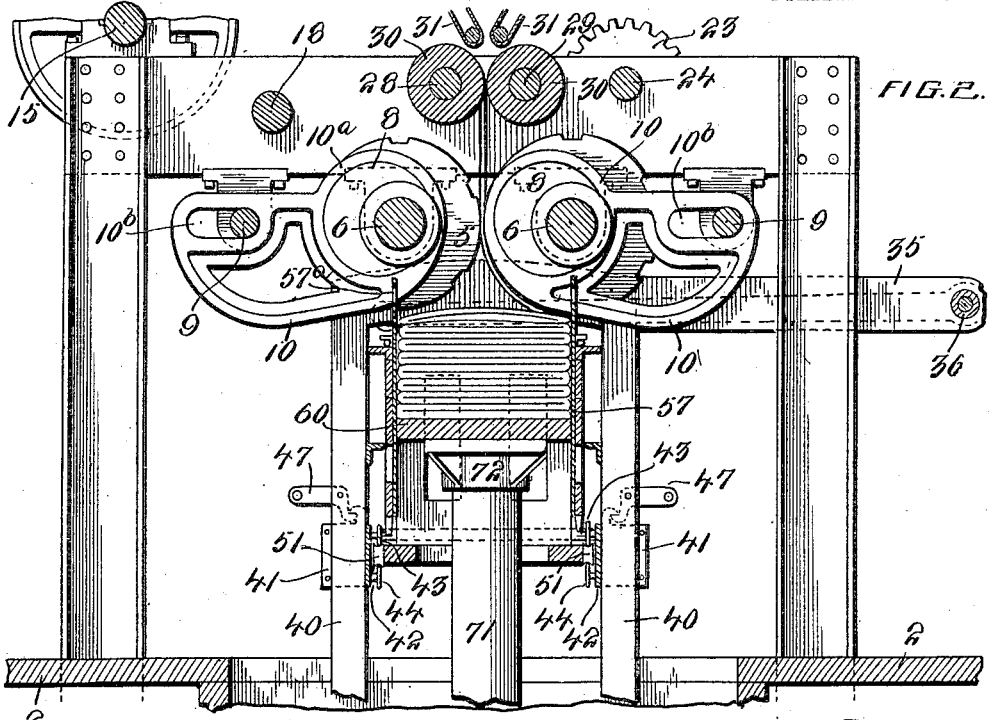
Figure 3:
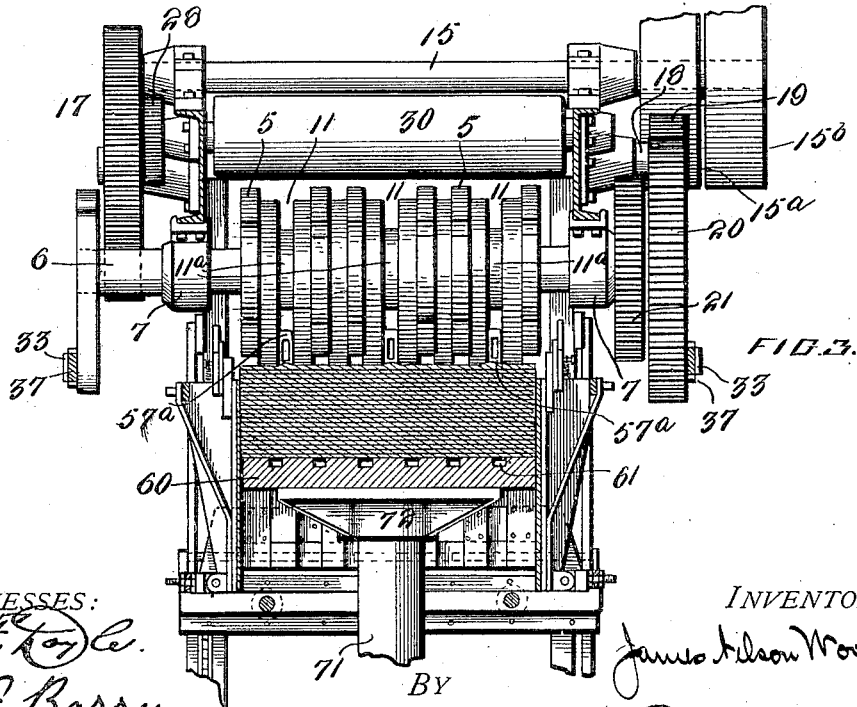

Referring to the accompanying drawings, Figure 1 represents a side elevation of a cotton baling press embodying my said improvements. Fig. 2 is a sectional view of the upper part of the same showing the bale partly completed. Fig. 3 is a sectional view of the upper part of the press taken at right angles to the plane of section in Fig. 2. Fig. 4 is a detail view of the upper part of the press, partly in section, showing the manner of inserting the retaining bars after the bale is completed. Fig. 5 is a similar view showing the bale box dropped from operative relation with the baling rolls previous to its removal from the press. Fig. 6 is a perspective view of one form of bale box which I contemplate using.

In the drawings 1 represents the main frame of the press, 2 the baling floor, 3 the oscillating baling frame, constructed to receive the removable bale box, said parts being of the same construction as the corresponding parts shown in my former application.

5, 5 are the baling rollers each of which comprises a plurality of disks mounted on shafts 6, 6 supported in bearings 7, 7 in the main frame, said disks being preferably provided with peripheral notches or recesses $5^a$ to prevent them from slipping with respect to the cotton or other material operated upon. The disks are suitably spaced upon their shafts and between certain of the disks I provide eccentrics 8, the disks and eccentrics being keyed or otherwise secured to the shaft, and the eccentrics carrying the presser bars 10, which coöperate with the disks in forming the bale. Each of the presser bars is provided at its inner end with an eccentric strap portion $10^a$ and at its outer end with a slot $10^b$ having a sliding engagement with one of the supporting bars 9, all as set forth in my former application. In my present invention, however, I arrange the disks and eccentrics on the shafts in such manner that one, two or more spaces, indicated at 11, 11, 11 (three of such spaces, being here shown) are formed in the length of each roller. These spaces are conveniently formed by omitting one of the disks at each point where the space is desired and replacing the same by a collar $11^a$, but obviously the same result could be obtained by the omission of one of the eccentrics and its presser bar or by otherwise changing the distribution of the disks and presser bars on the shafts.

The bale box, which is indicated as a whole at 50, has its side walls 57 provided with perforated ears $57^a$, $57^a$, $57^a$ extending up into the spaces 11 below the roller shafts 6, as shown in Figs. 1, 2, 3 and 4 when the box is in operative relation with the roller disks and presser bars to facilitate the insertion of a plurality of transverse retaining bars 80, 80, 80 to retain the bale in compressed condition, as hereinafter described, until the bale bands are secured in position.

In the machine here illustrated which follows closely that shown in my former application, power is applied by means of a driving shaft 15, carrying a pinion 16, meshing with gear 17 on shaft 18, having a pinion 19 on the other side of the machine (shown in dotted lines Fig. 1) meshing with gear 20 on one of the shafts 6, 6, said shafts being geared together by gears 21, 22. The gear 22 also meshes with and drives a gear wheel 23, on a transverse shaft 24, carrying at its opposite end a gear 25 which meshes with a gear 26 on a shaft 29 carrying one of a pair of feed or condensing rollers 30, 30, the other roll having its shaft 28 provided with a gear 27 meshing with the gear 26. These rollers 30, 30 are mounted above the baling rollers and the cotton bat is delivered thereto in any desired manner. In the drawings, Fig. 1, I have shown a pair of oppositely inclined conveyers 31, 32, for supplying the cotton to the condensing rollers, and these belts may be driven in any desired manner (not shown).

In order to impart the proper oscillatory motion to the baling frame 3, in time with the movements of the presser bars, I provide for operating the baling frame from one of the shafts 6, which in this instance carries the eccentrics for operating the connected series of presser bars, and is directly geared with the shaft of the other baling roller. The said shaft 6 (being the one to the left in Figs. 1 and 2) is provided with two crank pins 33, 33, one of which is carried on a crank arm 34 at one side of the machine and the other pin 33 being carried by the large gear 20, on the opposite side of the machine. The oscillating baling frame is provided with laterally extending arms 35, 35 at one side of the same carrying a cross bar 36. Links 37, 37 connect the crank pins 33 and the cross bar 36 and thus provide for the oscillation of the frame in proper timed relation with the movements of the presser bars.

The oscillating baling frame is provided with four vertically disposed standards 40, upon each of which is mounted a vertically movable slide 41. These slides are connected in pairs by transversely extending bars 42, parallel with the axes of the baling rollers. Each of the bars 42 is provided with an upper and a lower track or rail 43 and 44 respectively to engage the upper and lower portions of grooved wheels 51, 51 with which the bale box 50 is provided. The slides 41 carrying the bale box are adapted to be raised upon the standards 40 as hereinafter described, and locked in raised position in any desired way. I have shown for this purpose, hook shaped locking devices 45 on each of the slides 41 and pivoted catches 46 secured to standards 40, in position to be engaged by said locking devices 45. The catches 46 are each provided with an arm 47 and said arms 47 are connected in pairs by cross bars 48, 48ª for simultaneous movement.

49 represents a cord, chain or other flexible connection which extends from the rod 48ª around suitable pulleys, or guides to the rod 48 so that by elevating the rod 48, which can be accomplished by a slight blow even when the bale box contains a bale, all of the catches 46 are simultaneously withdrawn from the locking devices 45, to permit the bale box and the slides 41 to fall to their lowest position. The slides 41 are held in their lowest position by suitable stops or projections 41ª, 41ª on the standards 40, and at such a level that the bale box can be shoved from the adjacent baling floor 2, directly into the baling frame, the rollers 51 entering between the rails 43 and 44.

The bale box 50 is preferably of knock down structure as shown in detail in Fig. 6, to facilitate the removal of the bale, although it may be made in other ways. As here shown it comprises a rectangular bottom frame 52, provided on opposite sides with the grooved rollers 51, which project far enough below said frame to support the box and enable it to be rolled when it is on the baling floor and in moving it into and out of the baling frame. At each end of the bottom frame are the pivoted end walls or sections 53, 53 hinged or pivoted to the bottom frame at 54, 54 and provided at or near their upper ends with notches 55 and locking devices 56, the latter being shown as pivoted hooks.

57, 57 represent the side walls of the bale box, which are provided at their lower ends with trunnions 58, engaging pivotal bearings on the bottom frame, and having at their upper edges longitudinally projecting studs 59, which enter the notches 55 in the end walls, and are secured therein by the locking hooks 56, when the box is in closed position as clearly shown in the drawings. The studs 59 are here shown as being the end portions of a continuous bar 59 extending along the top edge of each side wall 57, and this construction is simple and strong.

60 represents the bottom of the bale box, which normally rests upon the bottom frame but is free to be moved vertically through the box. The top face of the bottom plate 60 is provided with a plurality of transverse grooves 61, to facilitate the insertion of bale ties, bands or wires after the bale is formed, and the side walls are cut, preferably, away at their lower edges between the trunnions 58, to accommodate burlap or other wrapping, for the bale which is preferably laid upon the bottom 60 before the bale is formed.

Certain of the walls of the box (in this instance the side walls) are provided near their upper edges with very short projections or studs 62 to engage the bottom 60 when the latter is moved upward through the box and limit its upward movement with respect to the box. These studs are preferably so located that they will lie within certain of the bale tie recesess 61 and will not project above the bottom 60 and they are advantageously beveled on their upper sides.

The side walls 57 of the box are provided with the perforated ears 57ª before referred to, corresponding in number and location with the spaces 11 of the baling rollers. The oscillating baling frame is provided with a suitable pressure device, a hydraulic cylinder 70, piston and plunger 72 to engage the bottom 60 of the bale box being here shown, and the cylinder is connected with a suitable fluid pressure device or pump (not shown) provided with the usual relief valve which can be adjusted to open when the desired pressure for which the valve is set has been reached.

The operation of the apparatus so far as the bale forming operation is concerned, is identical with that described in my former application. A bale box is run into the oscillating frame, from the baling floor, the rollers of the box engaging the rails 43, 44 and the bottom of the box being covered with a piece of burlap or other material if the bale is to be covered. The plunger is operated to raise the bottom of the box until it engages the studs 62 when the further upward movement of the plunger raises the box into operative relation with the baling rollers and presser bars, where it is locked by the engagement of the locking devices 45 and catches 46. The driving shaft is then started, and the cotton is fed in between the baling rollers and compressed in laminated folds by the combined action of the rollers, the presser bars, and the oscillating baling frame, the bottom of the bale box receding into the box, against the pressure device, relieved at intervals by the relief valve before referred to, until it reaches the lower end of the box and the bale is completed. The oscillating frame is then arrested by stopping the driving shaft, preferably in the position shown in Fig. 4, when the bale is under greatest compression by the pressure bars, the oscillating frame being in an extreme position at one end or other of its movement. The retaining bars 80 are then placed over the top of the bale and inserted through the ears 57ª as shown in Fig. 4. The oscillating frame is then moved to a vertical position, the catches 46 are released and the bale box is dropped to the level of the baling floor, upon which it is drawn out for the purpose of removing and tying the bale, while another bale box is inserted in the press, so that another bale can be formed while the previous one is being tied and the press is thus operated practically continuously.

What I claim and desire to secure by Letters Patent is:—

1. In a baling press, the combination with baling rollers provided with spaces at intervals throughout their length, the spaces of one roller being in a line transversely of the roller shafts, with those of the other roller, a baling box, bale retaining devices adapted to be passed through the spaces in said rollers, and means for securing the bale securing devices to the bale box.

2. In a baling press, the combination with baling rollers provided with spaces at intervals throughout their length, the spaces of one roller being in a line transversely of the roller shafts, with those of the other roller, and a bale box provided with retaining bar securing devices, adapted to extend into said spaces, and the retaining bars for engaging said securing devices.

3. In a baling press, the combination with baling rollers provided with spaces at intervals throughout their length, the spaces of one roller being in a line transversely of the roller shafts, with those of the other roller, and a bale box provided with retaining bar securing devices, adapted to extend into said spaces, means for detachably locking said bale box in operative relation with the baling rollers, and the retaining bars for engaging said securing devices.

4. In a baling press, the combination with baling rollers provided with spaces at intervals throughout their length, the spaces of one roller being in a line transversely of the roller shafts, with those of the other roller, and a bale box provided with retaining bar securing devices, adapted to extend into said spaces, an oscillating baling frame, a bale box movable vertically therein, detachable locking devices for holding said bale box in operative relation to said rollers during the formation of the bale, and the retaining bars, for engaging the said securing devices after the formation of the bale.

5. In a baling press, the combination with baling rollers provided at intervals longitudinally with recesses, of an oscillating baling frame, a removable bale box therefor provided on opposite sides with bar securing devices adapted to extend into said recesses of the baling rollers, the retaining bars, means for elevating said bale box in said baling frame into operative relation with the baling rollers, and locking means for holding the bale box in operative position.

6. In a baling press, the combination with baling rollers provided with spaces, at intervals throughout their length, the spaces of one roller being in a line transversely of the roller shafts, with those of the other roller, and a bale box having two opposite sides provided with projecting perforated ears, adapted to extend into the spaces in said rollers, and retaining bars for engaging said ears after the formation of the bale.

7. In a baling press, the combination with the baling rollers, and a series of presser bars extending in opposite directions from said rollers, and having horizontally disposed bale engaging portions, said rollers and presser bars being provided with spaces extending transversely to the axis of the roller shafts, and disposed at intervals longitudinally of said shafts, a bale box, bale retaining devices adapted to be passed through said spaces, and devices for detachably securing said bale retaining devices to the bale box, and means for moving said presser bars toward and from the bale.

8. In a baling press, the combination with the baling rollers comprising spaced sections disposed longitudinally of the roller shafts, of a series of eccentrics carried by the roller shafts between certain of said spaced sections, presser bars engaging said eccentrics, and having horizontally disposed bale engaging portions, said roller sections, and eccentrics being arranged to provide spaces extending transversely of the roller shafts at intervals throughout the length of the rollers, a bale box and securing devices for engaging bale retaining devices, secured to said bale box in line with said spaces, and bale retaining devices for engaging said securing devices.

In testimony whereof I affix my signature, in the presence of two witnesses.

JAMES N. WOOD.

Witnesses:
WM. P. DE SAUSSURE,
LANEY JONES.